United States Patent [19]

Erb

[11] Patent Number: 4,465,196

[45] Date of Patent: Aug. 14, 1984

[54] BICYCLE RACK

[76] Inventor: Richard I. Erb, 910 Croton Dr., Alexandria, Va. 22308

[21] Appl. No.: 299,512

[22] Filed: Sep. 4, 1981

[51] Int. Cl.³ .............................. A47F 5/01; A47F 7/04
[52] U.S. Cl. ........................................ 211/19; 211/20
[58] Field of Search ..................... 211/17, 18, 19, 20, 211/21, 22

[56] References Cited

U.S. PATENT DOCUMENTS

| 570,465 | 11/1896 | Dilley et al. | 211/19 |
| 4,047,614 | 9/1977 | Radek | 211/20 |
| 4,063,647 | 12/1977 | Blackmore | 211/19 |

FOREIGN PATENT DOCUMENTS

| 27928 | 6/1921 | Denmark | 211/20 |
| 56849 | 10/1939 | Denmark | 211/19 |
| 315617 | 12/1962 | France | 211/18 |
| 211408 | 9/1940 | Switzerland | 211/20 |
| 24427 | of 1897 | United Kingdom | 211/18 |
| 867753 | 5/1961 | United Kingdom | 211/19 |

Primary Examiner—Ramon S. Britts
Assistant Examiner—Robert W. Gibson, Jr.
Attorney, Agent, or Firm—Thomas E. Beall, Jr.

[57] ABSTRACT

A bicycle rack for three-point support of a bicycle wheel. A base, mounted on a rigid support, carries two spaced apart pairs of outwardly diverging, inwardly converging tire wedging members. Between them is a gripping assembly that engages and holds in place a bicycle wheel. The outwardly diverging, inwardly converging tire-wedging members may be substantially identical stiff wire members, each continuous and shaped generally like an M. There is a base portion at each end, and from each end which springs a leg curved back at its outer end to an angularly and inwardly extending portion. The two angularly and inwardly extending portions are joined by a central gripping portion.

21 Claims, 24 Drawing Figures

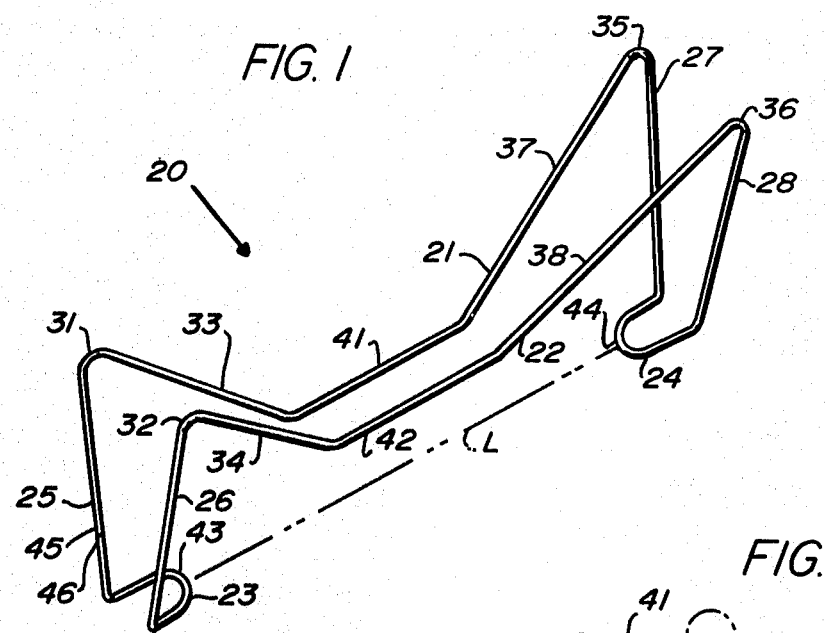
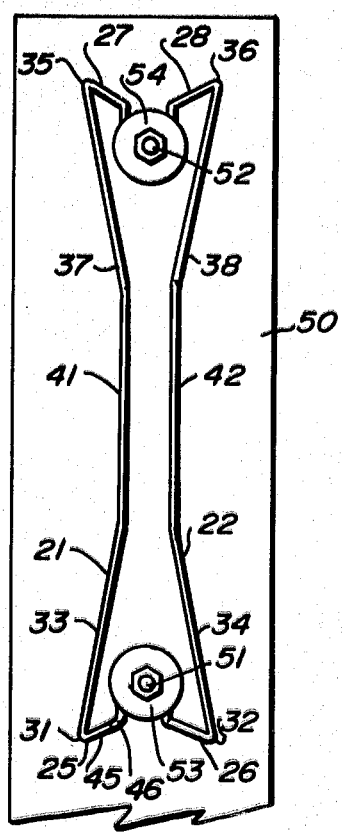
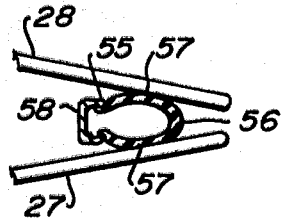
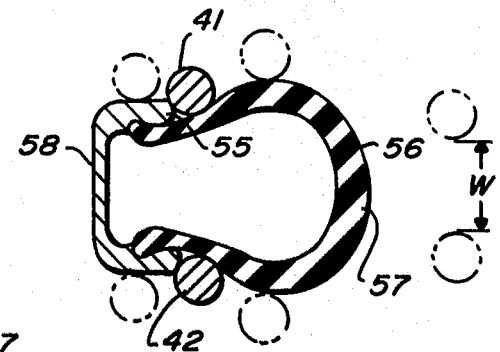
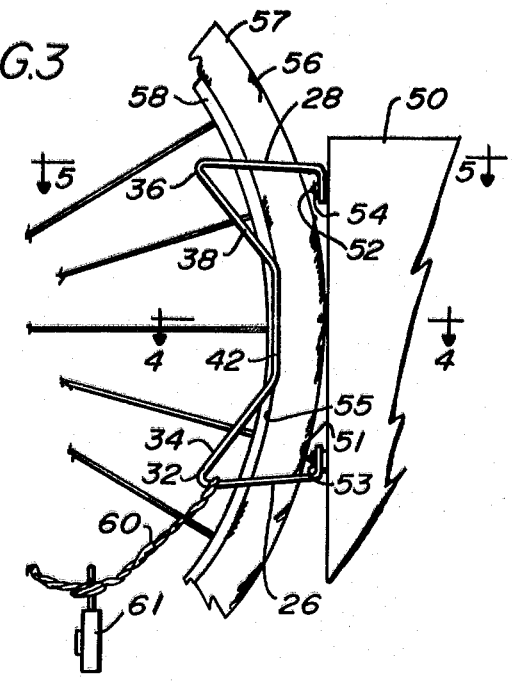

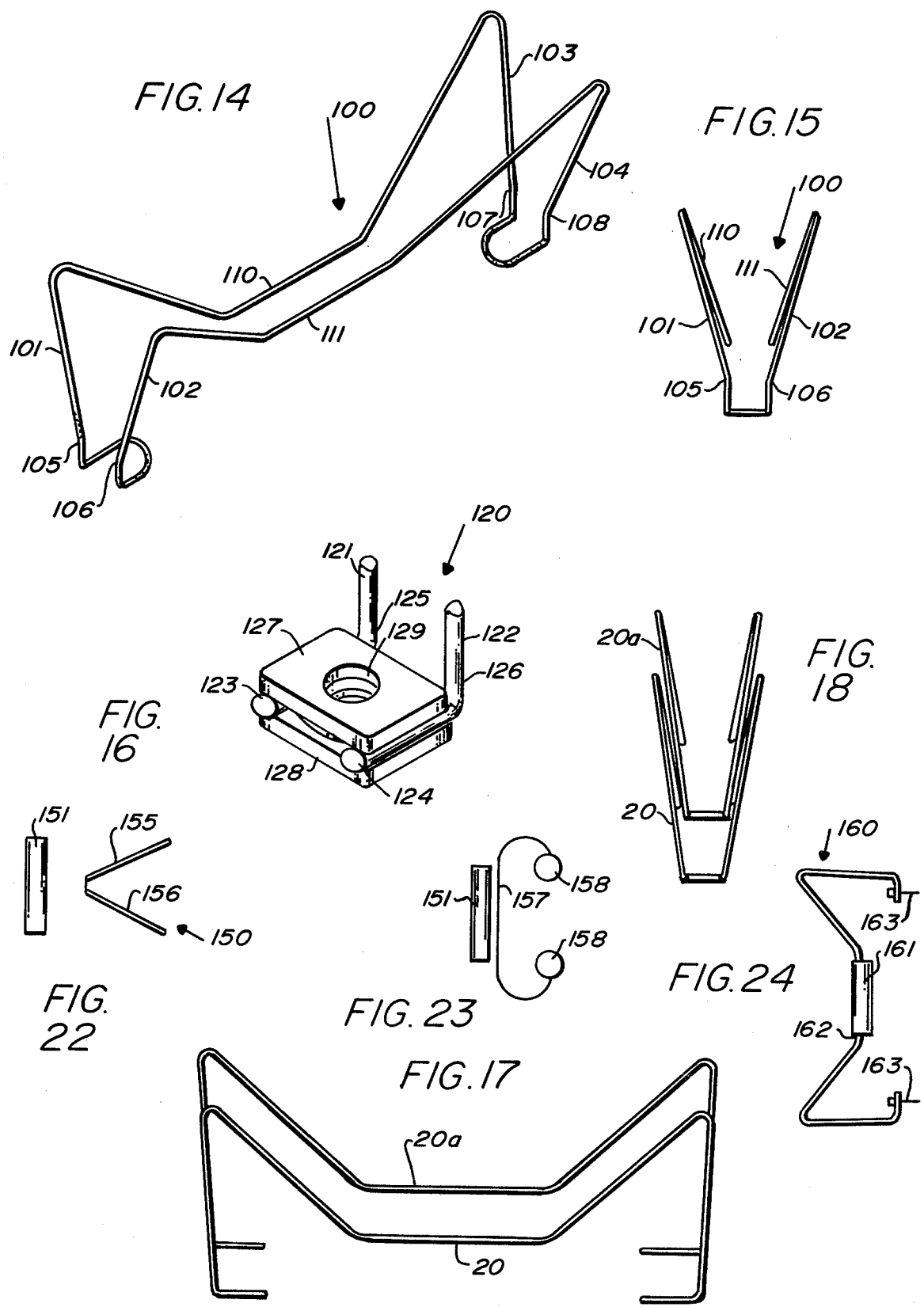

BICYCLE RACK

This invention relates to an improved bicycle rack.

BACKGROUND OF THE INVENTION

Most bicycle racks have characteristically been unattractive and ungainly devices constructed of heavy, rigid materials, e.g., steel pipes or welded rods, with vertical wheel slots wide enough for all standard wheel-fender combinations. When multi-speed bicycles with narrow wheels have been placed in such racks, they have frequently twisted or fallen, often resulting in paint scratches or other damage. Such heavy racks have been designed primarily for security and not for bicycle stability, and they are unsuitable for many applications, such as for display stands and holding devices enabling mechanical work on the bicycle.

Some bicycle racks have been designed with side pieces which loosely support a wheel at two locations. Such racks lack stability and wheel retention capability.

Some racks have no versatility, being designed for a single type of use and not feasible for other uses.

Kickstands, considered standard equipment on most bicycles, are useful but provide no security and frequently fail to support the bicycle adequately on uneven surfaces or in congested areas where if one bike falls, they all fall.

Many bicycle racks are expensive but still do not support the bicycles. Some are inexpensive enough but with few other virtues: some cannot accommodate fenders; some collect trash and fallen leaves; some discourage their use and one finds bicycles lying around them rather than in them; some become easily damaged during use; some provide hazards to pedestrians; some tend to damage wheel spokes.

The inventor knows of no really satisfactory general-purpose bicycle rack other than that of the present invention.

OBJECTS OF THE INVENTION

A primary object of the invention is to provide a practical, secure, efficient, and versatile wheel-retention device or rack for supporting bicycles and the like.

Another object is to provide a bicycle rack that can be used for storage, for security, for display, and for maintenance of a bicycle.

Another object is to provide a rack that can be used to support the bicycle in a normal upright position or in a vertical position.

Another object is to provide a rack that is relatively inexpensive and yet reliable, capable of mass production and yet suitable for different sizes of bicycles.

Another object is to provide a bicycle rack that can be used for storage of unicycles.

Another object is to provide a rack readily adaptable for storage of mo-peds and light motorcycles.

Another object is to provide a bicycle rack that can be attached to a permanent support or to a movable support.

Another object is to provide a bicycle rack capable of use in transporting bicycles by car.

Another object is to provide a bicycle rack that, when attached to a permanent support, cannot easily be removed therefrom when a bicycle is locked in it.

SUMMARY OF THE INVENTION

Broadly speaking, the bicycle rack of this invention comprises base means for attachment to a rigid stationary support, two spaced apart pairs of outwardly diverging, inwardly converging tire wedging members, and gripping means in between the two pairs of wedging members for engaging and holding in place a bicycle wheel.

The invention is a device, a rack, for supporting a single bicycle or the like in an upright position.

The bicycle rack of this invention comprises a wall-mounted device for gripping the bicycle wheel, at either the rim or the tire, located in between a pair of guiding or funneling devices that help to guide the wheel into the gripping device while helping to retain the wheel in place after the wheel is grasped by the gripping device. Thereby, the rack gives three-point wheel support coupled with wheel retention.

Wheel guiding or funneling is a necessary aid to insertion of the bicycle into the rack. The gripping device is gradually spread apart as the wheel is inserted, first contacting the funneling portion. As the wheel is forced into the rack, the gripping device continually hugs the tire and rim.

In a preferred form of the invention, two connected, resilient, essentially non-parallel side pieces are provided as the funneling portions which wedge against the tire sidewalls at the top and bottom of the rack, while a relatively straight center bar portion exerts a spring clamping or gripping force along the arc of the tire or rim. This three-point support stabilizes the wheel in an upright position, and the clamping and frictional forces prevent inadvertent roll out.

Each rack is preferably mounted vertically on a post or wall by use of one or more (preferably two) fasteners. Mounting fasteners are positioned so that, when a bicycle wheel is secured in the rack using a standard locking device, removal of the fasteners is restricted.

More specifically, a preferred form of the bicycle rack of this invention comprises a pair of outwardly diverging, inwardly converging, substantially identical stiff wire members. Each member is continuous and is shaped generally like an M, having a base at each end; from each leg springs a leg that is preferably normal to the imaginary line joining the two bases. At its upper end the leg is curved back to provide an angularly extending portion going toward that imaginary line, and the two angularly extending portions are joined by a central portion of substantial length that is parallel to and spaced away from the imaginary line. At each end, the bases turn inwardly along the imaginary line as an axis, and the bases have attachment means enabling securement to a rigid stationary support.

The two wire members may be separate members welded to a nut-like member at their inturned bases. Alternatively, the two wire members may be part of one continuous member providing attachment means by a U-turn. The two members (whether separate or part of the same wire) may each be planar or may be bent out at a point along each leg.

The wire rack of the invention is compact and weighs approximately one pound. Its novel vice-like holding feature exerts clamping and frictional forces, originating in the central portion of the rack on an arc of the wheel rim or on the tire sidewalls; these forces increase as the wheel is extracted, because of the rounded contour of the tire sidewalls and because the width of the wheel rim is less than that of the tire.

In addition to the presently preferred structure just described, the invention may take other forms as described below. The basic operation of these forms is the same or similar, although the structures are somewhat different.

The invention provides efficient and secure storage of bicycles and the like in homes, apartments, retail stores, sidewalk parking areas, schools, dormitories, recreational centers, parks, and elsewhere. In addition, the invention can be used as a wheel vice to facilitate assembly or maintenance actions on bicycles.

The rack can be mounted on the surface of a vertical or horizontal support, preferably vertical, or recessed into slots in the structure of fences, walls, decorative refuse container shrouds, and other places. For some applications, the rack may be recessed into a slot so that only the looped ends of the rack are accessible for locking purposes. Recessing improves the general appearance of the entire assembly and helps to protect the rack from vandalism, careless usage, and natural elements.

Side forces on the wheel are absorbed by the resilient bending and twisting of the rack material, thereby avoiding wheel damage. Entry into the rack is facilitated by the non-parallel side portions that guide or funnel the wheel into the desired location. The wheel is fully seated in the rack when the tire rests against the mounting fasteners, or when the tire sidewalls are wedged into the converging portion of the rack. Wheel retention in the rack results primarily from the spring force applied to a section of the wheel rim or to the tire sidewalls by the center portion of the rack.

While typically the bicycle usually is supported horizontally, both wheels on the ground and either wheel in the rack, the retention provided by the rack makes it possible to stand the bicycle on end with the front wheel elevated, the rack itself preferably being elevated, as a means of conserving floor space. It also enables a unicycle wheel to be "plugged" into the rack and held at any height. Not only can the rack be sized for a typical multi-speed bicycle having 26 or 27 inch tires, it can also be used for wide tires not only by original design and dimensioning but also by widening the wedge angle and center bar spacing, either by hand or with the aid of a simple prying tool. Permanently altering the spacings causes the wire to twist rather than bend. This fact makes it possible to preserve the basic functional shape of the rack sides even though the spacings are changed. If one rack is to be used interchangeably with a variety of wheel sizes, extraction of a relatively wide tire can be facilitated by simultaneously lifting and pulling the wheel from the rack. This action serves to reduce the pull force required to remove the wheel from the rack.

The wire rack of this invention is preferably secured to a fixed support by two fasteners located on the inturned bases. When a bicycle wheel is fully seated in a rack and secured in it by a conventional locking device, access to the fasteners is restricted, so that the rack is effectively locked to the fixed support.

The vicelike wheel support facilitates bicycle maintenance. With the front wheel in the rack, a simple strut or support about one foot long can be placed under the center portion of the bicycle to elevate the rear wheel slightly, so that pedals, gears, and brakes can be operated freely for maintenance or adjustment purposes. The front wheel can be elevated in like manner if the rear wheel is seated in the rack.

Also, the rear wheel of an inverted bicycle can be placed in the rack and the bicycle held at an angle so that either the seat or the rear luggage rack can rest on a horizontal surface, with the result that the front wheel will be elevated about waist high for easy maintenance. This is of particular advantage for bicycles having cable-operated hand brakes or handlebar mounted gear selectors, since such items make an inverted bicycle unstable when placed on a horizontal surface.

Similarly, a bicycle can be inverted with its front wheel seated in the rack and the rear wheel elevated. In this case, it is necessary to use a cord or the like to secure the rear portion (i.e. seat post) of the bicycle frame to both handlebars to keep the rear wheel in a vertical plane.

The entire wire rack is preferably coated with either vinyl, nylon, or epoxy, or is plated with zinc or chrome for corrosion protection, appearance, and to obtain desired frictional characteristics.

A pivotal mounting may be included in the basic structure of the rack, or included as an optional item to enhance accommodation of small (i.e. 20 inch) diameter wheels into racks which may be mounted at the optimum height for the 26–27 inch wheels. A hinged adaptor can be fixed to the mounting surface of the rack so that the rack can pivot downwardly as required to conform to the upper contour of the smaller wheel. The assembly is preferably lightly spring-loaded to return to the vertical position once such a small wheel is removed. An alternative assembly is to mount some racks permanently at a downward slant for exclusive use by small-wheeled bikes.

Other objects, advantages, and uses of the invention will appear from the following description of some preferred embodiments.

BRIEF DESCRIPTION OF THE DRAWINGS

FIG. 1 is a view in perspective of a wire bicycle rack embodying the principles of the invention.

FIG. 2 is a view in end elevation of the rack of FIG. 1 mounted on a rigid stationary vertical support, the bottom of which is broken off.

FIG. 3 is a view in side elevation of the rack and support of FIGS. 2 and 3 with a portion of a bicycle wheel therein.

FIG. 4 is an enlarged view in section taken along the line 4—4 in FIG. 3. Broken line circles indicate other positions of the rack's central portion.

FIG. 5 is a view in section taken along the line 5—5 in FIG. 3.

FIG. 14 is a view in perspective of a modified form of wire rack embodying the invention.

FIG. 15 is an end view of the rack of FIG. 14.

FIG. 16 is an enlarged fragmentary view in perspective of the base portion of a different modified form of rack according to the invention.

FIG. 17 is a view in side elevation of two racks nested together.

FIG. 18 is an end view of the two racks nested together.

FIG. 22 is a view in section taken along the line 22—22 in FIG. 21.

FIG. 23 is a view in section taken along the line 23—23 in FIG. 21.

FIG. 24 is a view in side elevation of a further modified form of the invention.

DESCRIPTION OF SOME PREFERRED EMBODIMENTS

The Rack 20 of FIG. 1

Figure 6:
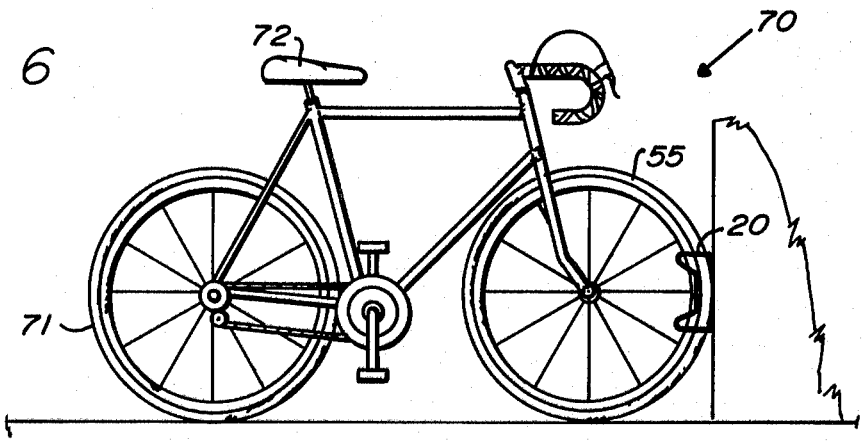
FIG. 6 is a view in elevation of a bicycle supported horizontally with its front wheel in the rack of FIGS. 1-5.

FIG. 1 shows a bicycle rack 20 embodying the invention. It comprises a single steel wire bent to provide two side portions or members 21 and 22. These members 21 and 22 diverge outwardly from each other and converge inwardly. They are substantially identical, each being continuous and shaped generally like the letter M. The rack 20 has two bases 23 and 24, one at each end; from the base 23 spring two legs 25 and 26, and from the base 24 spring two legs 27 and 28. The legs 25, 26, 27, and 28 are normal to an imaginary line L joining the bases 23 and 24. At its upper end, each leg 25, 26 is connected by a curved portion 31, 32 to an angularly extending portion 33, 34 going toward the imaginary line L. Similarly, the legs 27 and 28 are connected by curved portions 35 and 36 to angularly extending portions 37 and 38. The two angularly extending portions 33 and 37 of the side member 21 are joined together by a central portion 41, and the two angularly extending portions 34 and 38 are joined together by a central portion 42. The central portion 41 and 42 are of substantial length, about one-third of the length of the M. The central portions 41 and 42 are parallel to and are spaced away from the imaginary line L.

The bases 23 and 24 at each end are turned inwardly along a parallel to the imaginary line L and provide anchor portions with an end curve 43 or 44, respectively. In the form of the invention shown in FIG. 1 the two side members 21 and 22 are part of one continuous wire with abutting ends 45 and 46. The members 21 and 22 are spaced about ¾ inch apart, and are preferably formed of steel wire ¼ inch in diameter or larger to provide adequate strength and resiliency for the desired application. The rack 20 may be plated, painted, galvanized, or coated with plastic.

The Installation of FIGS. 2 to 4

The wire rack 20 is installed on a rigid support member 50, such as a post. A bolt or screw 51 or 52 and a washer 53 or 54 clamp each base 23, 24 to the support member 50, which may be an upright wood pillar. The rack 20 is now ready for use.

A bicycle wheel 55 (see FIGS. 3 and 4) is guided or funneled into the rack 20 by the inwardly converging legs 25, 26, 27, and 28 while the central portions 41 and 42 are forced apart by the tire 56 of the wheel 55, the sidewalls 57 making contact. When the wheel 55 is fully seated, the portions 41 and 42 press against a wheel rim 58 or against the tire sidewalls 57 near the rim 58, urged there by the spring pressure of the formed wire. The wheel rim 58 is typically wider than ¾ inches but is narrower than the widest portion of the tire sidewalls 57, so that the two portions 41 and 42 partially close behind the tire 56 and thus hold the wheel 55 in the rack 20.

The rack 20 provides the needed funneling that aids the insertion of the wheel 55, and during the funneling in of the wheel, 55 the tire contacts some or all of the angled sections, 33, 34, 37, 38 of the rack 20 before it touches the central portions 41 and 42, thereby helping to spread apart the central portions 41 and 42 to aid wheel entry. The central portions 41 and 42 are initially spaced about ¾ inch apart, while the wheel rim, 58 is typically one inch wide and the tire 56 is 1¼ inches wide or wider. Thus, as the wheel 55 is forced into the rack 20, the central portions 41 and 42 hug the tire 56 and the rim 58, as shown in FIG. 4.

FIGS. 3 to 5 illustrate the wheel 55 fully seated in the rack 20, the tire sidewalls 57 in firm contact with the legs 27 and 28 at the top and with the legs 25 and 26 at the bottom of the rack 20, while the center portions 41 and 42 press against an arc of the wheel rim 58. This three point retention is an important feature of the invention.

It is not always necessary to fully seat the wheel 56 in the rack 20 in order to provide adequate support. Some "balloon" tires can be held upright by partially inserting them in a rack 20 adjusted for relatively narrow tires. In this case the tire engages the rack 20 lightly at three places, but due to the softness of the tire, clamping and frictional forces are sufficient to retain the wheel and thus keep the bicycle upright.

For security against theft the cyclist requires the usual chain or cord loop, such as a loop 60 shown in FIG. 3 in combination with a suitable padlock 61. When the wheel 55 is locked into the rack where it becomes very difficult indeed for anyone to get access to the screws or bolts 51 and 52, and thereby to remove the rack 20 along with the bicycle from the permanent support fixture. The difficulty is such that most thieves would certainly abandon the project. Thus, the device is as safe as the loop 60 and the lock 61.

Various Ways of Mounting the Bicycle in the Rack (FIGS. 6 through 9)

FIG. 6 shows one typical way of supporting the bicycle in the rack. In this instance, a bicycle 70 is located horizontally on the supporting floor or ground with its front wheel 55 in the rack 20 and its rear wheel 71 outboard therefrom. The bicycle 70 can easily be set into this support and positioned so that there is no danger of collapse.

Figure 7:
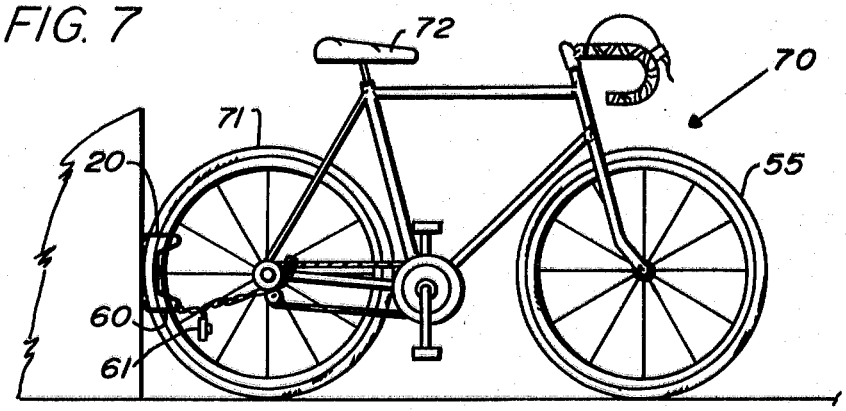
FIG. 7 is a similar view with the bicycle supported horizontally in the rack by its rear wheel.

FIG. 7 shows the same general type of mounting of the bicycle 70 and shows that the rear wheel 71 can be supported in the rack 20 with the front wheel 55 outboard.

Figure 8:
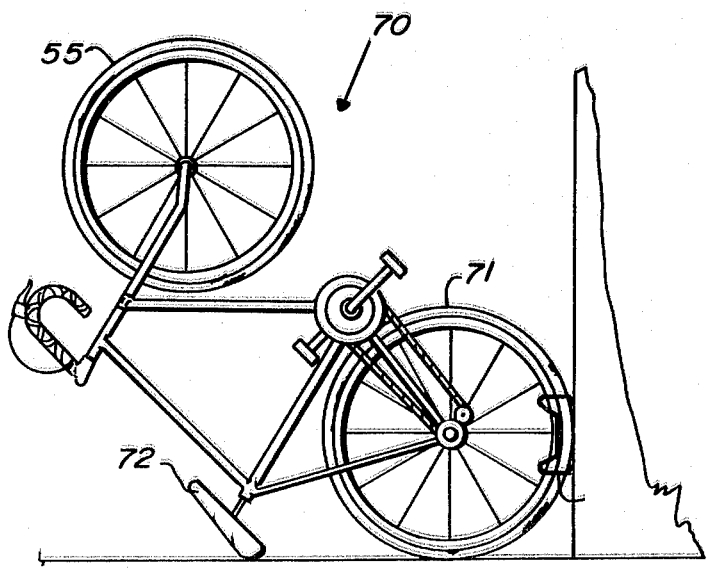
FIG. 8 is a similar view with the bicycle supported upside down and at an angle with the rear wheel in the rack.

FIG. 8 shows the rack 20 mounted just as in FIG. 6 and 7, but with the bicycle 70 inverted with the rear wheel 71 in the rack, the bicycle 20 resting on the rear wheel 71 and on its seat 72 with the front wheel 55 up in the air. This is an aid to repair maintenance work being done on the bicycle 70, and also may provide more convenient for a user who is short of space than do the storage systems shown in FIGS. 6 and 7.

Figure 9:
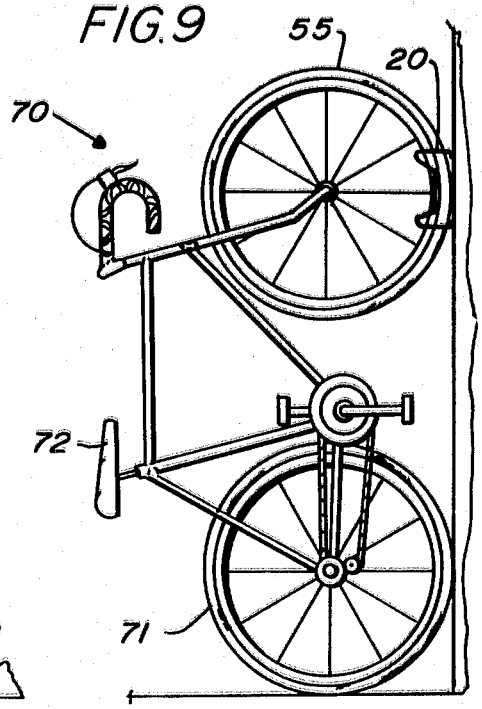
FIG. 9 is a view in elevation of the rack mounted higher on a vertical support and a bicycle supported vertically therein with its front wheel in the rack and its rear wheel on the ground.

A way of storage employing the rack 20 which is especially useful when space is even more limited, as perhaps in a hallway or portion of a garage, is to place the rack 20 at a relatively high level as shown in FIG. 9, and then to place the front wheel 55 in the rack 20 and rest the bicycle 70 on its rear wheel 71. The bicycle 70 is then completely vertical.

Many other ways of utilizing the rack 20 are, of course, possible. The rack is also applicable for a unicycle; for example, the wheel may be placed in the rack 20 with the unicycle resting on its seat.

Figure 19:
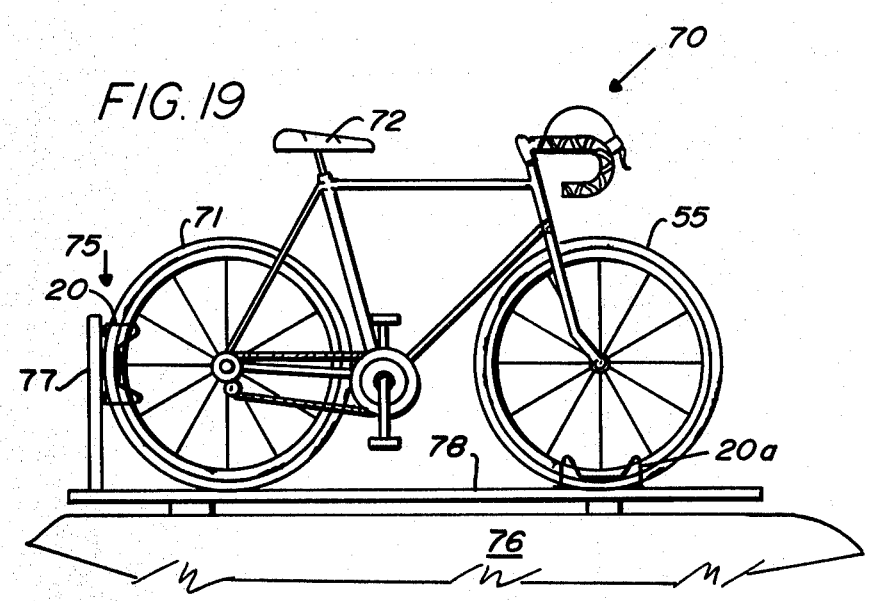
FIG. 19 is a fragmentary view of an automobile roof with an L-shaped frame thereon having one rack of the invention supported vertically and one supported horizontally and a bicycle mounted with each rack supporting one wheel.

An Automobile-Mounted Assembly
(FIG. 19)

A bicycle carrying assembly 75 for automobiles is shown in FIG. 19, enabling transportation of one or more bicycles 70 on the roof 76 of the automobile. Thus, the assembly 75 may be held on the automobile roof 76, and it provides an L-frame with an upright member 77 and a horizontal member 78. One rack 20 may be secured to the vertical member 77 and another, rack 20a secured to the horizontal member 78. Then the bicycle 70 is installed with one wheel 55 in the rack 20 and the other wheel 71 in the rack 20a. The bicycle 70 may be turned in either direction on the L frame. This illustrates the further versatility of the rack.

Similar assemblies may be used to support two or more bicycles on the roof of one car.

Figure 10:
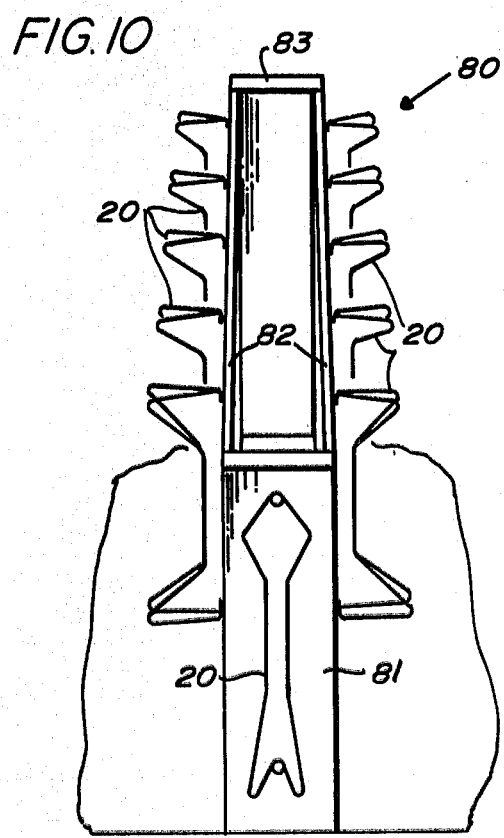
FIG. 10 is a view from above of a series of racks of the invention supported on a single support member.

A Rack System
(FIG. 10)

FIG. 10 shows a rack system 80 in which one rack 20 is supported by the end surface of an end post 81, and a series of other racks 20 are supported along stringers 82 going to another post 83. A number of bicycles may be stored in such a rack 80, which may be made as permanent and as decorative as desired.

Figure 11:
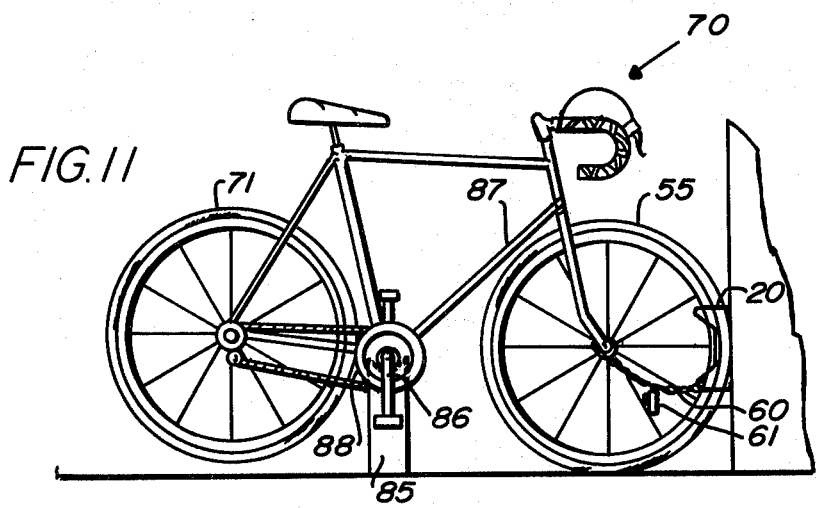
FIG. 11 is a view like FIG. 6 with the front wheel of the bicycle supported by the rack and with its frame in the pedal area supported by a block, enabling operation in a stationary position of the wheel and pedal.

Use of the Bicycle Rack for Display or for Working on the Bicycle Rack
(FIG. 11)

As shown in FIG. 11, while the bicycle 70 is supported with its front wheel 55 in a rack 20, a wooden block 85 placed under the central portion 86 of the bicycle frame 87, adjacent to the sprocket wheel 88, for example, may be used to enable a storage system in which the rear wheel 71 is elevated. This arrangement gives free operation of the pedals, gears, and rear brakes for repair and adjustment purposes, and for examination. Thus, the wheel retention resulting from the gripping function of the central portions 41 and 42 enables the use of the rack 20 as a wheel vice simplifying the performance of maintenance functions.

Figure 12:
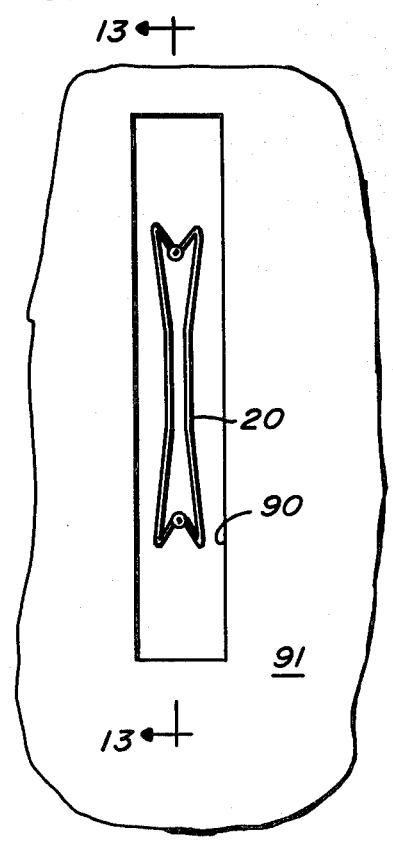
FIG. 12 is a head-on view of a bicycle rack wherein the wire rack is mainly inside a slot in the supporting member.
Figure 13:
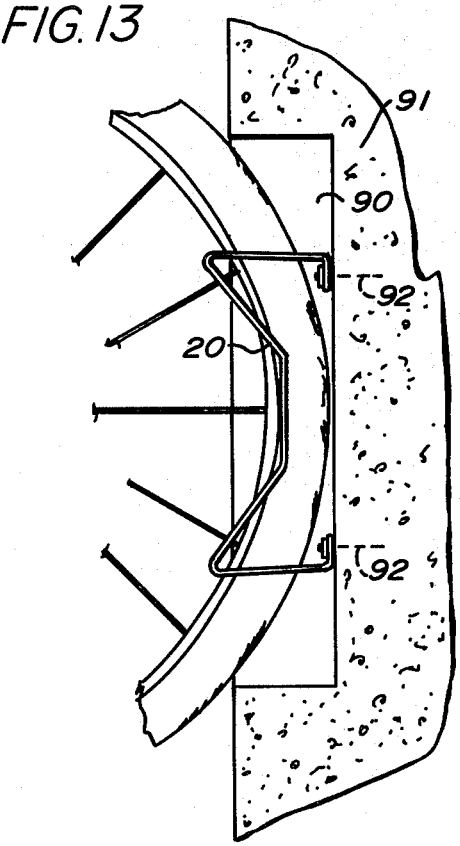
FIG. 13 is a view in section taken along the line 13—13 in FIG. 12, with a portion of a bicycle wheel shown in the slot.

A Slot Type of Installation
FIGS. 12 and 13

As shown in FIGS. 12 and 13, the rack 20 may be installed in a slot 90, which may be formed in a concrete wall or pillar 91, so that the rack 20 is substantially recessed, leaving enough of it to extend outwardly to enable a security chain and lock to be fastened. This system can be esthetically pleasing and just as convenient to use as the other systems. In this system, instead of using a screw, a bolt or even an unthreaded headed member 92, can be placed into the rack, and the member 92 preferably having a shank that can be keyed into the concrete when the concrete is poured.

Two Alternative Forms of Wire Rack 100
(FIGS. 14 to 16)

The rack 100 is exactly like the rack 20, except for one thing, and that is that each of its four legs 101, 102, 103 and 104 are bent at 105, 106, 107 and 108 respectively so that the side members 110 and 111 diverge more than in the rack 20. The bends 105, 106, 107, and 108 are easily applied, and the structure is especially useful when larger wheels are to be used, though it can also be used for smaller wheels, giving a somewhat narrower base if desired for installation purposes. Otherwise the operation of the rack 100 is the same as that described for the rack 20. This bending of the sides of the rack apart at some point above the mounting surface may help to insure manufacturing uniformity and to obtain desired rack geometry.

Another modified form of rack 120 of the invention (FIG. 16) uses two separate wires 121 and 122 for the sidewalls and legs of the rack 120. In this view only the base portions 123 and 124 and the lower parts of the legs 125 and 126 are shown, and it will be seen that the two legs 125 and 126 are each bent in to and end in the base portions 123 and 124. To these base portions 123 and 124 are welded suitable nuts 127 and 128, such as weld nuts formed with two weld projections each, each nut 127, 128 having a suitable threaded hole 129 surrounded then by a pilot flange. The base portions 123 and 124 are cradled between the projections and the pilot flange to facilitate simultaneous projection welding of both nuts 127 and 128 at once to the wires. Installation and operation are otherwise as has been previously described.

Nesting of the Devices
(FIGS. 17 and 18)

All three forms of the wire rack 20, 100, and 120 can be nested, but in FIGS. 17 and 18 the nesting of two racks 20 and 20a is shown. Only two are shown to avoid confusion, but the number that can be nested is indefinite. This aids, of course, in storing and shipping without preventing ready separation when they are actually to be installed. The legs normally bear against each other or against a part of the sides if they are not completely accurately stacked. This stacking enables improved compactness for storage and shipping and greater convenience.

The racks 20, 100, and 120, illustrated and described above, are typical for a multi-speed bicycle application. Various changes coming within the spirit of my invention may suggest themselves to those skilled in the art.

Other Modified Forms of the Invention
(FIGS. 20-24)

Figure 20:
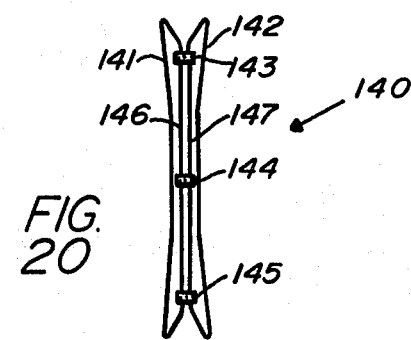
FIG. 20 is a view in end elevation of another modified form of rack according to the invention.

A rack 140 is shown in FIG. 20 to illustrate the fact that the rack may be made from two closed side members 141 and 142 joined by a crosslink or a series of crosslinks 143, 144, and 145. Each side member 141, 142 is a fully closed form, either molded or with ends welded, for example. Thus, the rack's base comprises the three crosslinks 143, 144, 145 (which can be bolted to a post, for example) plus two base portions 146 and 147. The continuous members 141 and 142 are otherwise shaped like the side portions 21 and 22 of the rack 20.

Figure 21:
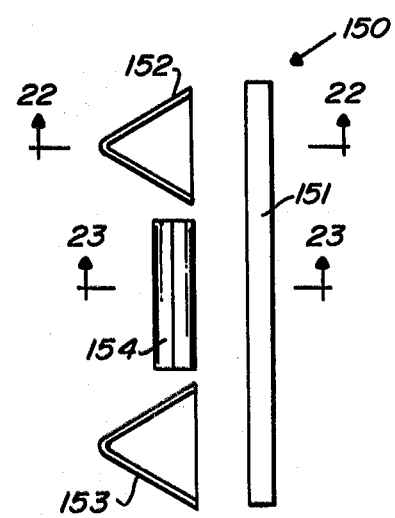
FIG. 21 is an exploded view in side elevation of yet another modified form of rack according to the invention.

FIGS. 21-23 show a rack 150 having a base strip 151 to which the other members of the rack are attached. These other members, shown in the exploded view, FIG. 21, and in the sections FIGS. 22 and 23, are independently attached to the base strip 151. They include an upper funnel 152, a lower funnel 153, and a central gripping member 154. The funnels 152 and 153 may be identical, each comprising two inverted rounded vee members 155 and 156 (FIG. 22). They may be welded to the strip 151. The central gripping member 154 may (see FIG. 23) comprise a spring steel strip 157 formed to the shape shown and having at each end a bar or roller 158. The spacing between the central gripping member 154 and the two funnels 153 and 152 may be adjusted at the time of manufacture, and a family of sizes may be produced.

FIG. 24 shows a rack 160 with a padded roller 161 over each central bar 162. The roller 161 may be a split cylinder or two halves joined together after they are in place. Or the roller 161 may be a tubular cylinder and the rack side made in two pieces joined by the cylindrical roller 161 and held in place by the screws 163 which mount the rack.

A rack may be made using only a central gripper like that shown in FIG. 23 in combination with a slot formed in a concrete or plastic member, like a wall, a planter, a refuse container shroud, or the like.

These are only exemplary of the many ways in which the concepts of the invention can be carried out.

The simple design of this rack can be optimized for vehicles ranging from unicycles to motorcycles by scaling the rack geometry to the wheel size, by varying the thickness and type of wire used, and by choosing a finished best suited for the application.

To those skilled in the art to which this invention relates, many changes in construction and widely differing embodiments and application of the invention will suggest themselves without departing from the spirit and scope of the invention. The disclosures and the descriptions herein are purely illustrative and are not intended to be in any sense limiting.

I claim:

1. A bicycle rack to be mounted on a rigid support member for receiving and holding one wheel of a bicycle, which wheel has a rim and a tire having sidewalls, said rack comprising:
   two substantially identical side members;
   two base means for mounting said side members on the support member, so that said side members have an orientation with respect to each other such that they are on opposite sides of a mid-plane of symmetry, and are each spaced laterally from the mid-plane of symmetry;
   each of said side members being a wire having opposite ends secured by said base means to the respective ends of the other of said side members;
   each of said side members further including two legs respectively extending from corresponding base means and laterally away from said mid-plane to outer ends;
   each of said side members further including two angularly extending portions integrally connected as a continuation of respective outer ends of said legs and extending from the outer ends of said legs laterally towards said mid-plane toward a line connecting said base means, and toward each other to inner ends;
   each of said side members further having a central portion integrally connecting the inner ends of said angularly extending portions;
   the outer ends of each leg being respectively a lateral distance from a corresponding leg outer end of the other side member substantially greater than the sidewall to sidewall dimension of a tire;
   the laterally adjacent inner ends of said angularly extending portion being spaced laterally apart from each other a distance less than the lateral distance between the outer ends of said legs and substantially less than the sidewall to sidewall dimension of a tire;
   said side members being means for receiving a wheel symmetrically inserted along said mid-plane between said side members to first engage all of said angularly extending portions with tire sidewalls, to thereafter slide a tire inwardly along said angularly extending portions for resiliently laterally spreading apart said central portions as a tire is forced inwardly along the mid-plane in engagement with said angularly extending portions until the widest sidewall to sidewall dimension of a tire passes the inner ends of said angularly portions and said central portions resiliently close laterally toward each other radially inwardly of the widest sidewall to sidewall dimension of a tire and adjacent a rim in the fully seated position of a wheel with the outer periphery of a tire close to a support member; and
   in the fully seated position of a wheel, said inner ends of said angularly extending portions lie completely radially spaced inwardly from and closer together than the sidewall to sidewall greatest width portion of a tire, and said legs engage the greatest width portion of a tire at four points spaced away from said central portions.

2. A bicycle rack according to claim 1, wherein said two side members and said two base means are constructed of a single, bent, continuous closed loop of wire.

3. A bicycle rack according to claim 2, wherein said closed loop of wire is formed from a single piece of wire butt welded at its opposite ends at a position along one of said legs spaced from the adjacent base means and closer to the adjacent base means than said outer end of the associated leg.

4. A bicycle rack according to claim 3, wherein each of said central portions is linear, about one third the length of the rack, and parallel to and spaced away from a line connecting said base means.

5. The bicycle rack according to claim 4, wherein each of said base means is a U-shaped portion of said wire in a common plane with the other base means and oriented so that the U-shape opens outwardly away from the other base means.

6. The bicycle rack according to claim 2, wherein each of said base means is a U-shaped portion of said wire in a common plane with the other base means and oriented so that the U-shape opens outwardly away from the other base means.

7. The bicycle rack according to claim 1, wherein each of said base means is a U-shaped portion of said wire in a common plane with the other base means and oriented so that the U-shape opens outwardly away from the other base means.

8. The bicycle rack according to claim 1, wherein each of of said base means includes two linear wire portions respectively integrally joined at generally right angles to inner ends of the adjacent legs and extending parallel to a line joining said base means to thereby provide torsion spring means for adjusting the angular spaced apart relationship of said side members.

9. The bicycle rack according to claim 8, wherein said two side members and said two base means are constructed of a single, bent, continuous closed loop of wire.

10. The bicycle rack according to claim 9, wherein said closed loop of wire is formed from a single piece of wire butt welded at its opposite ends at a position along one of said legs spaced from the adjacent base means and closer to the adjacent base means than said outer end of the associated leg.

11. The bicycle rack according to claim 1 in combination with a rigid stationary vertical support having a series of vertical slots therein;
further including an additional plurality of said bicycle racks; and
said bicycle racks being respectively mounted within said slots for receiving a corresponding plurality of bicycle wheels.

12. The bicycle rack according to claim 1, wherein said wire is constructed of solid, coated, steel of generally one quarter inch diameter.

13. The bicycle rack according to claim 1, wherein said two side members and said two base means are constructed of a single, bent, continuous closed loop of wire;
said closed loop of wire is formed from a single piece of wire butt welded at its opposite ends at a position along one of said legs spaced from the adjacent base means and closer to the adjacent base means than said outer end of the associated leg; and
each of said base means is a U-shaped portion of said wire in a common plane with the other base means and oriented so that the U-shape opens outwardly away from the other base means.

14. The bicycle rack according to claim 13, wherein the inner ends of said angularly extending portions are spaced about a three quarter inch apart.

15. A bicycle rack according to claim 14, wherein each of said legs, each of said central portions, and each of said angularly extending portions are linear; and
each of of said base means includes two linear wire portions respectively integrally joined at generally right angles to inner ends of the adjacent legs and extending parallel to a line joining said base means to thereby provide torsion spring means for adjusting the angular spaced apart relationship of said side members.

16. The bicycle rack according to claim 1, wherein the inner ends of said angularly extending portions are spaced about a three quarter inch apart.

17. The bicycle rack according to claim 1, wherein each of said legs, each of said central portions, and each of said angularly extending portions are linear.

18. The bicycle rack according to claim 11, wherein said two side members and said two base means are constructed of a single, bent, continuous closed loop of wire;
said closed loop of wire is formed from a single piece of wire butt welded at its opposite ends at a position along one of said legs spaced from the adjacent base means and closer to the adjacent base means than said outer end of the associated leg; and
each of said base means is a U-shaped portion of said wire in a common plane with the other base means and oriented so that the U-shape opens outwardly away from the other base means.

19. The bicycle rack according to claim 18, wherein each of of said base means includes two linear wire portions respectively integrally joined at generally right angles to inner ends of the adjacent legs and extending parallel to a line joining said base means to thereby provide torsion spring means for adjusting the angular spaced apart relationship of said side members.

20. The bicycle rack according to claim 19, wherein the inner ends of said angularly extending portions are spaced about a three quarter inch apart; and
each of said legs, each of said central portions, and each of said angularly extending portions are linear.

21. The bicycle rack according to claim 18, wherein the inner ends of said angularly extending portions are spaced about a three quarter inch apart; and
each of said legs, each of said central portions, and each of said angularly extending portions are linear.

* * * * *